Mar. 13, 1923.
O. HALLINGSTAD
1,448,661
POTATO PLANTING ATTACHMENT FOR PLOWS
Filed Aug. 20, 1920
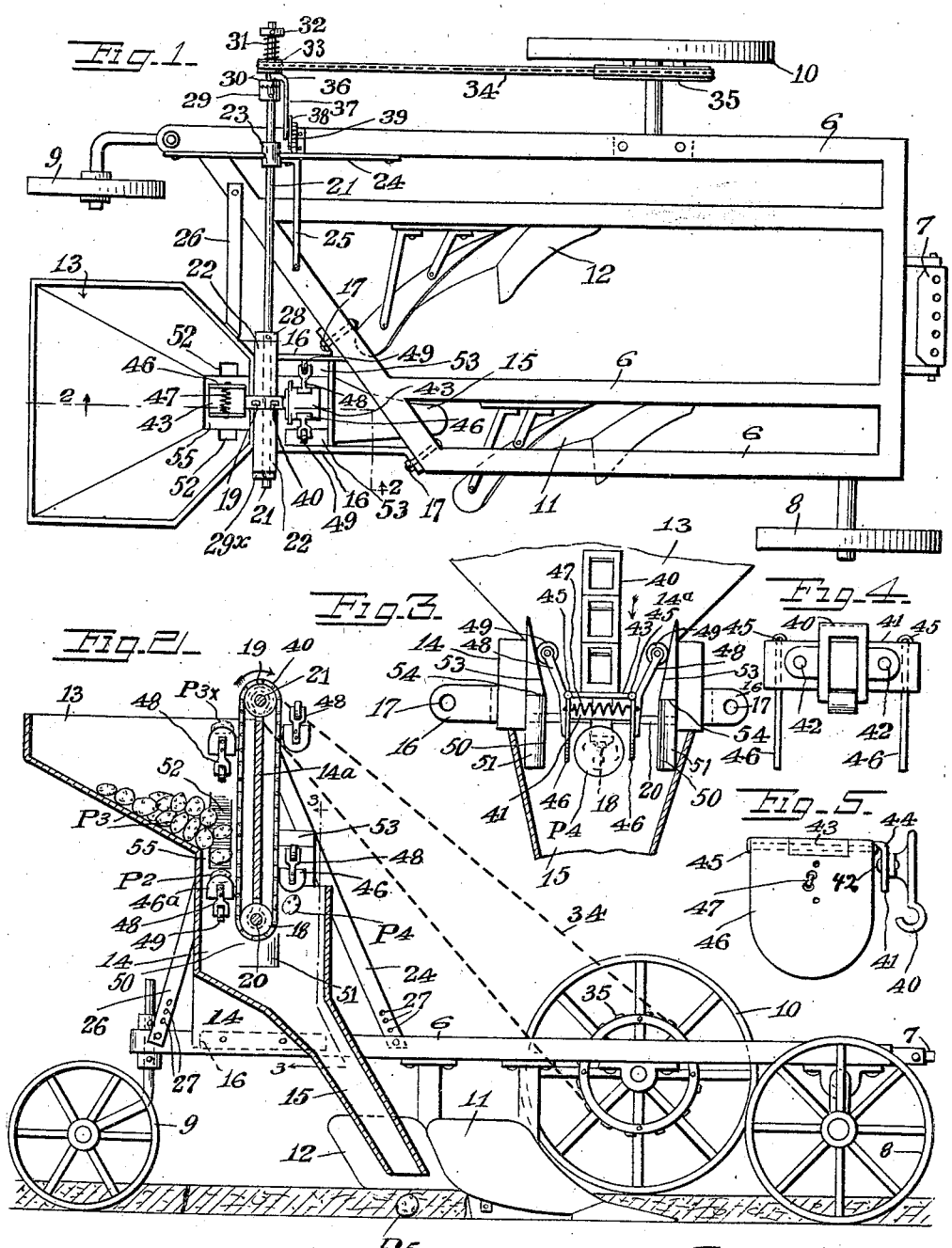
Inventor.
Ole Hallingstad,
By A.M. Carlsen, Attorney Patented Mar. 13, 1923.

1,448,661

UNITED STATES PATENT OFFICE.

OLE HALLINGSTAD, OF PLAZA, NORTH DAKOTA.

POTATO-PLANTING ATTACHMENT FOR PLOWS.

Application filed August 20, 1920. Serial No. 404,914.

*To all whom it may concern:*

Be it known that I, OLE HALLINGSTAD, a citizen of the United States, residing at Plaza, in the county of Mountrail and State of North Dakota, have invented a new and useful Potato-Planting Attachment for Plows, of which the following is a specification.

My invention relates to attachments for plows, and the object is to provide a gang plow with an attachment which when the plow is in action will automatically plant or drop seed potatoes one by one in the furrow made by one plow and let the second plow cover the potatoes by the second furrow which it turns over during the same one single drive of the whole plow.

In the accompanying drawing:

Fig. 1 is a top or plan view of a gang plow equipped with my planting attachment. Fig. 2 is a side elevation of Fig. 1 intersected on the line 2—2. Fig. 3 is an enlarged section on the line 3—3 in Fig. 2. Fig. 4 is a detail rear elevation of the potato dropping device in Fig. 3 showing how said device is secured on the chain carrying it. Fig. 5 is a left hand side elevation of Fig. 4.

Referring to the drawing by reference numerals, 6 designates the frame, 7 the draft clevis, 8, 9 and 10 the supporting wheels of an ordinary gang plow of the kind comprising several plows, but most often only two plows, arranged as those marked 11 and 12 in my drawing.

The usual leaning position of some of the supporting wheels I have not shown because the same is well known in plows prior to my invention.

Mounted upon the rear end of the frame 6 is a potato hopper 13 having a vertical downward extension 14, terminating in a dropping tube 15, which is arranged to drop the potato into the furrow made by the plow 11, as the potato $P^5$ in Fig. 2. Said extension 14 is secured by soft iron arms 16 and bolts 17, to the plow frame and extends some distance forward of the vertical front wall $14^a$ of the hopper. Said wall $14^a$ is cut away for two sprocket wheels 18, 19. Sprocket 18 rotates on a stump shaft 20 fixed in the sides of extension 14; and sprocket 19 is fixed on a shaft 21. The latter shaft is journaled in suitable bearings 22, upon the wall $14^a$ and in a bearing 23 held by a bracket or frame 24: the latter is steadied by a brace 25 extending down to the plow frame; a similar brace 26 may steady the hopper. All of said elements 24, 25, 26, are made with several bolt holes 27, so as to be adjustable up and down on the plow frame according to the height of the plow wheels. The spout 15 may also be extensible to adapt it for vertical adjustment, but as adjusting means are common I will not here further describe the details thereof.

Fixed on the shaft 21 are two collars 28, $29^\times$ to prevent sliding of the shaft, and a clutch member 29 adapted for engagement by a clutch member 30 which is slidable on the shaft and always under inward pressure by a spring 31 and a collar 32.

Removably secured upon the clutch member 30 is a sprocket pinion 33, which is driven by a link-belt 34 for a sprocket wheel 35, which is suitably connected with the supporting wheel 10.

The clutch member 30 is engaged by a shifter fork 36 having a rod 37 attached to a hand lever 38, which may be suitably engaged with a notched sector 39 when the spring 31 is compressed and the clutch member 30 disengaged from the member 29, in stopping the planting attachment during idle riding of the plow, or during plowing without planting.

In further describing the planting device, an endless link belt 40 is stretched over the two sprockets 18, 19 and carries several, in the present drawing four, plates 41, secured to certain links of the chain by rivets 42 (see Fig. 4) and each having a main body 43 bent at right angles (at 44 in Fig. 5) to the portion secured to the link.

Hinged at 45 to each end of the plate body 43 is a flap 46. The two flaps or jaws in each device are attached together by a pulling coil spring 47, which tends at all times to close the jaws toward each other; but such closing is regulated by an arm 48 secured on each jaw and provided with an antifriction roller 49, which rollers ride on certain uneven tracks during the travel of the link belt, as will appear from the following description of the operation.

In the operation of the whole machine, when the plow is drawn forward and the clutch members 29—30 engaged, each pair of jaws 46 in passing upward as at $46^a$ in Fig. 2, receives a potato as $P^2$ from the lot $P^3$ in the hopper, the jaws being held spread by the rollers 49 being on the narrow-spaced tracks 50, which start with inclines 51 and extend to side pockets or clearances 52 (see Figs. 1 and 2), which are of even lateral depths and open upward into the inclined sides of the hopper. As the rollers 49 swing into said clearances 52 in the tracks, the potato P² is clasped between the spring-closed jaws and is then carried as P³ˣ over the top of the wall 14ᵃ and downward outside the hopper until released, as at P⁴, by spreading of the jaws; said spreading being caused by the closing of the arms 48 as the rollers 49 move down along inclines 53. When the rollers get below the ends 54 of said inclines the spring may spread them again until they reach the inclines 51 where they get closed again, so as to hold the jaws spread and ready to receive the next potato as at P². The potato carrying devices are so arranged or spaced on the chain that as soon as one upward moving device has left the passage 55 (in Fig. 2) the next potato clasping device has entered the passage sufficiently to prevent downward escape of potatoes from the hopper.

As already stated before, as each potato drops into the furrow, like potato P⁵, it is covered by the furrow turned by plow 12.

The distance between the potatoes planted in the same row is regulated by the size of the sprocket 33, say fifteen inches apart, and when a longer or shorter spacing is desired said pinion is exchanged for a larger or smaller one (not shown) and the belt 34 lengthened or shortened by inserting an extra link or two in it, or by removing a link. Or if the belt is a leather belt or similar kind it may be long enough to fit the largest pinion, and when smaller pinions are used its slack may be taken up by a belt-tightener of any suitable type. In fitting the attachment onto plows of slightly different form of frame, the arms 16 being made of extra soft iron may be bent considerably without heating them.

Having thus described my invention, what I claim is:

In a potato planting attachment fixed upon the frame of a riding plow, a mechanism frame, a hopper mounted upon the frame and having one open side and a dropping tube therebelow, an endless flexible conveyor having on its outer side clamps comprising pivoted clamping jaws and springs closing said jaws in pairs to make them grip, carry and drop potatoes; one run of said conveyor being arranged to move upwardly in the open side of the hopper, the other run moving downwardly into the upper end of the dropping tube, and inter-engaging means on the clamping jaws and on the mechanism frame for opening each pair of jaws while it engages and while it drops a potato; each of said clamps comprising an angle plate having one arm secured to the conveyor and its other arm standing at about right angles to the conveyor belt and having two clamping members hinged one to each opposite edge of the arm, and a contraction coil spring extending between the jaws of each pair to pull them toward each other.

In testimony whereof I affix my signature.

OLE HALLINGSTAD.